US012554565B2

(12) United States Patent
Yamaguchi et al.

(10) Patent No.: US 12,554,565 B2
(45) Date of Patent: Feb. 17, 2026

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Akihiro Yamaguchi, Kita (JP); Ken Ueno, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 10 days.

(21) Appl. No.: 18/664,411

(22) Filed: May 15, 2024

(65) Prior Publication Data

US 2025/0094260 A1 Mar. 20, 2025

(30) Foreign Application Priority Data

Sep. 15, 2023 (JP) ................. 2023-150224

(51) Int. Cl.
*G06F 11/00* (2006.01)
*G06F 11/07* (2006.01)

(52) U.S. Cl.
CPC ................. *G06F 11/0751* (2013.01)

(58) Field of Classification Search
CPC ................................ G06F 11/0751
USPC ....................................... 714/1–57
See application file for complete search history.

(56) References Cited

U.S. PATENT DOCUMENTS

| 11,867,592 | B2 | 1/2024 | Takada | |
| 2014/0372813 | A1* | 12/2014 | Shin | G06F 11/0706 |
| | | | | 714/704 |
| 2016/0103724 | A1* | 4/2016 | Kim | G06F 11/0751 |
| | | | | 714/37 |
| 2018/0082201 | A1* | 3/2018 | Cantwell | G06N 20/00 |
| 2020/0293018 | A1* | 9/2020 | Tsunoo | G06N 3/0499 |
| 2021/0089425 | A1* | 3/2021 | Lavi | G06F 11/3409 |

(Continued)

FOREIGN PATENT DOCUMENTS

WO WO 2020/179188 A1 9/2020

OTHER PUBLICATIONS

Cabello et al., "Fast and Accurate Time Series Classification Through Supervised Interval Search", ICDM 2020: IEEE International Conference on Data Mining, 6 pages.

(Continued)

*Primary Examiner* — Sarai E Butler
(74) *Attorney, Agent, or Firm* — Oblon, McClelland, Maier & Neustadt, L.L.P.

(57) ABSTRACT

An information processing device includes one or more processors. The one or more processors are configured to: adjust a first distance between first time-series data and a plurality of identification patterns corresponding to a plurality of classes by using a degree of existence indicating a degree by which a plurality of times of the first time-series data are times at which the plurality of respective identification patterns exist; calculate a first feature amount indicating a feature of the first time-series data by using the adjusted first distance; and obtain, by inputting the first feature amount to an estimation model learning a parameter, the similar identification pattern, and the degree of existence to reduce an estimation error, the identification pattern similar to the first time-series data, the class, and the degree of existence.

12 Claims, 10 Drawing Sheets

(56) References Cited

U.S. PATENT DOCUMENTS

2021/0117303 A1* 4/2021 Azmandian ............. G06F 17/15
2023/0236915 A1* 7/2023 Thakkar ................ G06F 11/076
　　　　　　　　　　　　　　　　　　　　714/47.2
2023/0342402 A1* 10/2023 Mitsuka ................ G06F 16/906

OTHER PUBLICATIONS

Le et al., "Learning Perceptual Position-Aware Shapelets for Time Series Classification", ECML PKDD 2022: The European Conference on Machine Learning and Principles and Practice of Knowledge Discovery in Databases, 17 pages.

* cited by examiner

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2023-150224, filed on Sep. 15, 2023; the entire contents of which are incorporated herein by reference.

FIELD

Embodiments described herein relate generally to an information processing device, an information processing method, and a computer program product.

BACKGROUND

In a class classification technique for time-series data (time-series waveform data) such as sensor data, it is desirable to clarify the basis of classification in addition to the improvement in the classification performance (estimation accuracy). As a class classification technique of time-series data for clarifying the bases of classification, a supervised shapelet learning method of learning one or more shapelets which are short waveform patterns (identification patterns) effective for classification together in addition to a classifier (estimation model) has been proposed and has attracted attention in the fields of data mining and machine learning in recent years.

DETAILED DESCRIPTION

Figure 1:
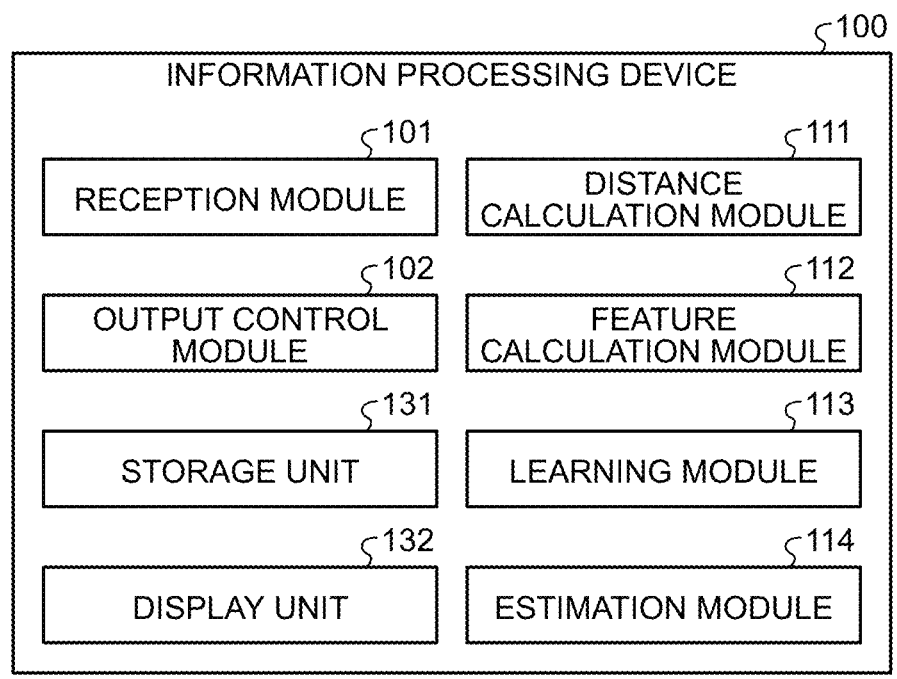
FIG. 1 is a block diagram illustrating an information processing device according to a first embodiment.

In general, according to one embodiment, an information processing device includes one or more processors. The one or more processors are configured to: adjust a first distance between input first time-series data and a plurality of identification patterns respectively corresponding to a plurality of classes by using a degree of existence indicating a degree by which a plurality of times of the first time-series data are times at which the plurality of respective identification patterns exist; calculate a first feature amount indicating a feature of the first time-series data by using the adjusted first distance; and obtain an identification pattern similar to the first time-series data, the class, and the degree of existence by inputting the first feature amount to an estimation model. The estimation model inputs a second feature amount indicating a feature of second time-series data for learning to estimate a class of the classes corresponding to an identification pattern similar to the second time-series data among the plurality of identification patterns. The estimation model learns a parameter, the similar identification pattern, and the degree of existence indicating a time at which the similar identification pattern exists to reduce an estimation error.

Exemplary embodiments of an information processing device, an information processing method, and a computer program product will be explained below in detail with reference to the accompanying drawings. The present invention is not limited to the following embodiments.

The following embodiments can be applied to the following system that analyzes time-series data such as sensor data detected and collected, for example, by various sensors. Applicable systems are not limited to the following.

A system in which time-series data is classified into any of a plurality of classes. The plurality of classes includes, for example, a normal class indicating that the time-series data is normal and an abnormal class indicating that the time-series data is abnormal.

In a shapelet learning method in the related art, a distance (similarity) between partial time-series data (partial waveform) that is most suitable (similar) on time-series data and each shapelet is used as a feature amount. At this time, basically, the shapelet existence region is the entire time-series data. The existence region can be interpreted as a region that is a target of collation with a shapelet as a region where the shapelet exists in the time-series data.

The shapelet learning method can find a shapelet that allows positional deviation. However, a technique for specifying in which region on the time-series data a shapelet appears (exists) has not yet been proposed. When it is searched whether the corresponding point is the existence region at all points (times) on the time-series data, it is required to learn a shapelet two to the power of Q times when the length of the time-series data (the number of points included in the time-series data) is Q, and it is practically impossible from the viewpoint of calculation time.

Although a technique of giving an existence region of a shapelet in advance is proposed, such a technique cannot find the existence region itself.

In the following embodiment, the existence region is estimated together with a classification result of the time-series data by using a classifier (an example of an estimation model) learned to specify a plurality of existence regions for each shapelet. For example, when the existence region of the shapelet is important for class classification, the classification performance can be improved. In addition, by displaying (visualizing or presenting) the existence region together with the shapelets serving as the bases of classification, it is possible to provide more explanatory information to the user.

For example, the embodiment has the following functions.

A function of adjusting a distance between a suitable shapelet and partial time-series data by using a degree of existence indicating a degree of existence region of the corresponding shapelet A function of updating the degree of existence so as to obtain the existence region of the shapelet that is visually easily understood while reducing the classification loss by the classifier (reducing the estimation error by the estimation model)

Note that, in the following, an example is be described in which a shapelet is used as an identification pattern used for classification, but the identification pattern may be a pattern other than the shapelet.

Here, terms and symbols used in the following description are described.

Hereinafter, the time-series data set is T, the number of items of time-series data included in the time-series data set T is I, the length of each time-series data is Q points, and the number of shapelets is K. The length of each shapelet is given as L points (L satisfies L<Q). Here, in order to simplify the description, it is assumed that the length of each time-series data is the same Q points, and the length of each shapelet is the same L points. When the length of each time-series data is the same Q points, the time-series data set T may be considered as an I×Q continuous value matrix. Extension to different lengths is easy for each.

In the following, a case where the time-series data is univariate time-series data is described as an example. In the case of the multivariate time-series data, for example, a method described below is applied for each univariate, and the multivariate time-series data can be easily extended so as to specify a shapelet and an existence region of the shapelet.

When the length of each shapelet is the same L points, the K shapelets (hereinafter, referred to as a shapelet S) are a K×L continuous value matrix. The existence region of the K shapelets is expressed by a degree of existence M expressed as a K×J continuous value matrix. J is J=Q−L+1 and represents a length of a region in which a shapelet can be searched among the lengths (Q) of the time-series data. Hereinafter, the degree of existence of the k-th shapelet (hereinafter, it is referred to as a shapelet $S_k$) (k is an integer satisfying 1≤k≤K) is expressed as $m_k$. The degree of existence $m_k$ is a J-dimensional vector. In addition, in the following description, a degree of existence (scalar value) of a j-th points (j is an integer satisfying 1≤j≤J) of the k-th shapelet is expressed as $m_{k,j}$.

For example, as the value is smaller, the degree of existence $m_{k,j}$ indicates that the degree of the existence region of the shapelet is smaller. As the value is larger, the degree of existence may indicate that the degree of the existence region of the shapelet is smaller. Hereinafter, the degree of existence indicating that the degree of the existence region of the shapelet is smaller as the value is larger is referred to as a penalty degree $m'_{k,j}$. The penalty degree $m'_{k,j}$ is calculated by using the degree of existence $m_{k,j}$, for example, by Formula (1). The ReLu function in Formula (1) is expressed by Formula (2).

$$m'_{k,j} = ReLU(-m_{k,j}) + 1 \quad (1)$$

$$ReLU(-m_{k,j}) := \begin{cases} -m_{k,j} & \text{if } m_{k,j} < 0 \\ 0 & \text{if } m_{k,j} \geq 0 \end{cases} \quad (2)$$

In Formula (1), the penalty degree is calculated so as to take a value in the range of [1, ∞]. The penalty degree $m'_{k,j}$ corresponds to a value (scalar value) of the penalty degree when the shapelet $S_k$ exists at the j-th point of the time-series data. The penalty degree $m'_k$ of each shapelet $S_k$ is a J-order vector having J penalty degree $m'_{k,j}$ as elements.

When the value of the penalty degree $m'_{k,j}$ is small, the j-th point of the time-series data is interpreted that a degree of the existence region of the shapelet $S_k$ is large. When the value of the penalty degree $m'_{k,j}$ is large, the j-th point of the time-series data is interpreted that a degree of the existence region of the shapelet $S_k$ is small.

As described below, in the embodiment, the penalty degree $m'_k$ (degree of existence $m_k$) is learned together with the plurality of shapelet S.

First Embodiment

FIG. 1 is a block diagram illustrating an example of a configuration of an information processing device 100 according to the first embodiment. As illustrated in FIG. 1, the information processing device 100 includes a reception module 101, an output control module 102, a distance calculation module 111, a feature calculation module 112, a learning module 113, an estimation module 114, a storage unit 131, and a display unit 132.

The reception module 101 receives inputs of various types of information to be used in the information processing device 100. For example, the reception module 101 receives time-series data used for learning by the learning module 113, time-series data to be estimated, and designation of various parameters used for learning or estimation.

The parameter is, for example, the following information.
Number K of shapelets
Length L of shapelet The distance calculation module 111 calculates distances DA (first distances) between time-series data TSA (first time-series data) input as the estimation target and the plurality of shapelets S. At the time of learning, the distance calculation module 111 calculates distances DB (second distances) between time-series data TSB (second time-series data) input for the learning process and a plurality of shapelets.

Here, the definition of the distance between the i-th (i is an integer satisfying 1≤i≤I) time-series data and the k-th shapelet $S_k$ is described. The distance between the time-series data and the shapelet is defined as the minimum value among the J distances when an offset j is changed in the range of 1 to J and the distance between the partial time-series data extracted based on each offset and the shapelet is calculated. The offset corresponds to a point serving as a reference of the partial time-series data to be collated with the shapelet among the partial time-series data included in the time-series data. The reference point is, for example, a start point (earliest time) of the partial time-series data but may be any other point such as a central point or an end point.

As described above, the shapelet exists at a position of which the distance is close to (similar to) the partial time-series data included in the time-series data. Note that, as the distance, for example, a Euclidean distance is used.

The distance calculation module 111 calculates the distances $d_{i,k,j}$ ($s_k$, $t_i$) between the shapelet $s_k$ and the partial time-series data corresponding to the offset j of an i-th time-series data $t_i$, for example, by Formula (3). Note that $L_k$ represents the length of the k-th shapelet, and when each shapelet has the same length, $L_k$ is the same value L for all k.

$$d_{i,k,j}(s_k, t_i) := \frac{1}{L_k} \sum_{l=1}^{L_k} (t_{i,j+l-1} - s_{k,l})^2 \quad (3)$$

Note that the distance is not limited to the distance calculated by Formula (3), and any other type of distance may be used. For example, the distance may be calculated by a dynamic time-warping (DTW) distance instead of the Euclidean distance.

The distance calculation module 111 further adjusts the distances (distances DA and DB) by using the penalty degree $m'_k$. Hereinafter, the adjusted distance may be referred to as an adjusted distance. For example, the distance calculation module 111 calculates the adjusted distance by multiplying the distance by the penalty degree $m'_k$.

As described above, the penalty degree is calculated so as to take a value in the range of $[1, \infty]$. Therefore, by multiplying the distance by the penalty degree $m'_k$, the distance calculation module 111 calculates the adjusted distance so that the larger the penalty degree, the larger the adjusted distance. As a result, each shapelet can be easily matched with a point on the time-series data having a low penalty degree, and a suitable point on the time-series data becomes an existence region of the shapelet.

The feature calculation module 112 calculates a feature amount representing a feature of the time-series data by using the adjusted distance. For example, the feature calculation module 112 calculates a feature amount FA (first feature amount) representing the feature of the time-series data TSA by using the adjusted distance calculated from the time-series data TSA. During the learning, the feature calculation module 112 calculates a feature amount FB (second feature amount) representing the feature of the time-series data TSB by using the adjusted distance calculated from the time-series data TSB.

Specifically, the feature calculation module 112 calculates the feature amount $x_{i,k}$ representing the feature of the i-th time-series data $t_i$ for each shapelet $s_k$, by using the adjusted distance calculated for each shapelet $s_k$. The feature calculation module 112 calculates feature amounts $x_{i,k}$, for example, by Formula (4).

$$x_{i,k}(s_k, t_i, m_k) := \min_{j=1,2,\ldots,J_k} (ReLU(-m_{k,j})+1)d_{i,k,j} \quad (4)$$

Note that $J_k$ represents the length (offset range) of the region for searching for the k-th shapelet $s_k$. When each shapelet has the same length, $J_k$ has the same value J for all k's.

As shown in Formula (4), the feature calculation module 112 calculates the feature amount by aggregating the adjusted distances in the entire offset region of the time-series data in each shapelet. Formula (4) shows an example in which the minimum value of the plurality of adjusted distances corresponding to the plurality of offsets is used as the feature amount.

Note that the distance corresponding to Formula (3) can also be regarded as dissimilarity. Therefore, similarity may be conversely used instead of a distance. For example, the similarity may be defined to take a value of 1 when the shapelet $s_k$ is sufficiently similar to the partial time-series data corresponding to the offset j of the i-th time-series data $t_i$ and take a value of 0 otherwise.

In addition, the feature amount may be calculated by taking the sum over the offset j instead of taking the minimum value over the offset j as in Formula (4). In this case, instead of multiplication of the penalty degree $m'_k$ for the distance, division of the penalty degree $m'_k$ for the distance is used. As in this example, the feature amount can also be defined by using the number of partial time-series data similar to a shapelet on the time-series data.

The learning module 113 executes learning process of the classifier by using the time-series data TSB for learning. For example, the learning module 113 executes a learning process of updating the parameters of the classifier, the plurality of shapelets, and the penalty degree $m'_k$ so as to reduce the classification loss.

For example, the learning module 113 executes the learning process according to Formula (5). Formula (5) represents minimizing the classification loss that is the sum of a loss $G_i$ of each of the plurality of pieces of time-series data $t_i$. W represents a set of parameters $w_{c,k}$ (weights) of the classifier. c represents C (C is an integer of 2 or more) classes.

$$S \in \prod_{k=1}^{K} \mathbb{R}^{L_k}, W \in \mathbb{R}^{C \times (K+1)}, M \in \prod_{k=1}^{K} \mathbb{R}^{L_k} \overset{\text{minimize}}{\sum_{i=1}^{I} G_i} \quad (5)$$

The loss $G_i$ in Formula (5) is expressed by Formula (6). In addition, $\hat{y}_{i,c}$ in Formula (6) corresponds to the output of the classifier and is expressed by Formula (7). Note that $\hat{y}_{i,c\_i}$ in Formula (6) corresponds to the output of the classifier for the correct answer class $c_i$ (c_i). In this manner, the learning module 113 executes the learning process so as to reduce the error between the class output from the classifier and the correct answer class.

$$G_i := -\log\left(\frac{e^{\hat{y}_{i,c_i}}}{\sum_{c=1}^{C} e^{\hat{y}_{i,c}}}\right) + \lambda \sum_{k=1}^{K} \sum_{j=1}^{J_k-1} |m_{k,j+1} - m_{k,j}| \quad (6)$$

$$\hat{y}_{i,c}(x_i, w_c) := \sum_{k=1}^{K} w_{c,k} x_{i,k} + w_{c,0} \quad (7)$$

The classifier is not limited to a model that outputs a classification result as shown in Formula (7) and may be any model that estimates a class by inputting a feature amount, as long as parameters can be learned together with both the shapelet and the penalty degree (degree of existence) so as to reduce an estimation error.

Note that the loss $G_i$ in Formula (6) includes a second term related to the degree of existence $m_k$. The second term corresponds to a term (regularization term) for updating the degree of existence so that values of a plurality of degrees of existence at adjacent times come close to each other. The second term can be interpreted as a term for updating the degree of existence such that the existence region of the shapelet is a continuous wide region as much as possible on the time-series data. Note that the loss $G_i$ not including the second term may be used. When the second term is not included, there is a case where the existence region of the shapelet is not a region including a plurality of continuous points.

The learning module 113 updates the shapelet S and the parameters $w_{c,k}$ of the classifier so as to reduce the classification loss, for example, according to Formula (5) (shapelet and classifier updating unit). A method of updating the classifier may be any used method in the related art, and for example, a method of slightly updating the value of the parameter in a direction in which the classification loss is decreased (reduced) by the gradient descent method can be applied (see, for example, Xuan-May Thi Le et al., "Learning Perceptual Position-Aware Shapelets for Time Series Classification", ECML PKDD 2020: The European Conference on Machine Learning and Principles and Practice of Knowledge Discovery in Databases).

In addition, the learning module 113 updates the penalty degree at a point adapted on the time-series data for each shapelet so as to reduce the classification loss (penalty degree updating unit). As a method of updating the penalty degree, for example, a method using a gradient descent method can be applied, similarly to the shapelet S and the parameters of the classifier.

The estimation module 114 executes an estimation process on the time-series data TSA input as an estimation target by using the classifier learned by the learning module 113. For example, the estimation module 114 inputs the feature amount FA calculated for the time-series data TSA to the learned classifier and obtains the class estimated by the classifier, the shapelet corresponding to the class, and the penalty degree $m'_k$.

Note that the classifier may output the class c having the maximum value among $\overline{y}_{i,c}$ calculated, for example, by Formula (7) as the classification result or may output the likeliness of each class c as the classification result. The likeliness of each class c can be calculated, for example, by a Formula described as an argument of the log function of Formula (6).

The output control module 102 controls output of various types of information used in the information processing device 100. For example, the output control module 102 outputs (displays) information indicating the estimation result by the estimation module 114 to the display unit 132. The estimation result includes, for example, a shapelet output for the feature amount FA, a class that is a classification result, and the penalty degree $m'_k$. The penalty degree $m'_k$ corresponds to information indicating whether the region is an existence region.

At least a part of each module (the reception module 101, the output control module 102, the distance calculation module 111, the feature calculation module 112, the learning module 113, and the estimation module 114) may be realized by one or more processors. Each of the above units is implemented by, for example, one or a plurality of processors. For example, each of the above units may be implemented by causing a processor such as a central processing unit (CPU) and a graphics processing unit (GPU) to execute a program, that is, by software. Each of the above units may be implemented by a processor such as a dedicated integrated circuit (IC), that is, hardware. Each of the above units may be implemented by using software and hardware in combination. When a plurality of processors are used, each processor may implement one of the units or may implement two or more of the units.

The storage unit 131 stores various types of information to be used in the information processing device. For example, the storage unit 131 stores the time-series data TSB used for learning, the time-series data TSA to be estimated, and various parameters (the number K of shapelets, the length L of the shapelet, and the like). In addition, the storage unit 131 stores parameters (such as weights) of the classifier, the shapelet, and the penalty degree obtained by the learning process.

Note that, the storage unit 131 can be configured by any generally used storage medium such as a flash memory, a memory card, a random access memory (RAM), a hard disk drive (HDD), and an optical disc.

The display unit 132 is an example of a device that displays various types of information used in the information processing device 100. The display unit 132 is implemented, for example, by a display device such as a liquid crystal display.

Note that the information processing device 100 may be physically configured by one device or may be physically configured by a plurality of devices. For example, the information processing device 100 may be constructed on a cloud environment. Furthermore, each unit in the information processing device 100 may be dispersedly provided in a plurality of devices. For example, the information processing device 100 (information processing system) may be configured to include a device (for example, a learning device) having a function required for learning (such as the learning module 113) and a device (for example, the estimation device) having a function required for estimation (such as the estimation module 114).

Figure 2:
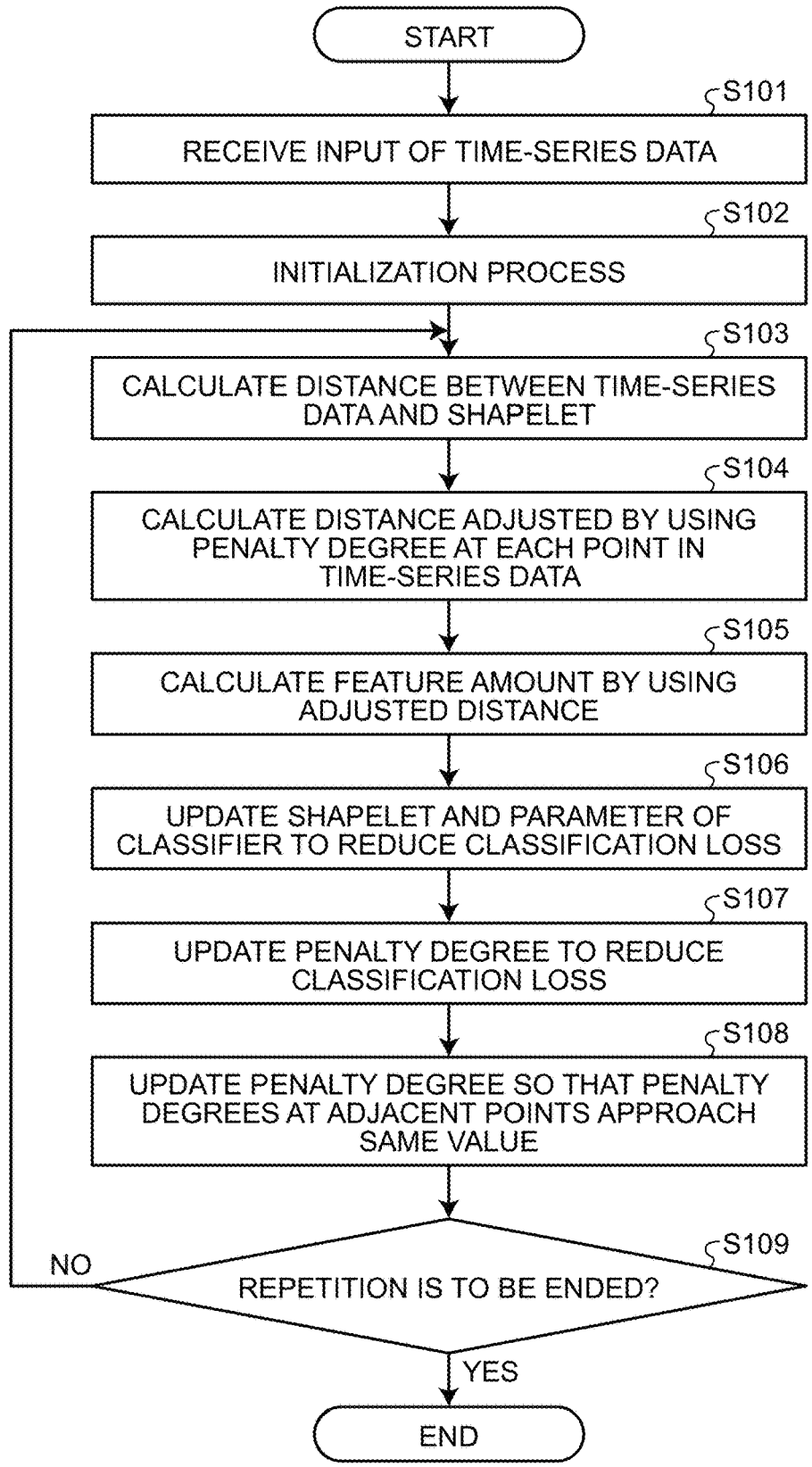
FIG. 2 is a flowchart illustrating a learning process according to the first embodiment.

Next, the flow of the learning process by the information processing device 100 according to the first embodiment is described. FIG. 2 is a flowchart illustrating an example of the learning process according to the first embodiment. An object of the learning process is to specify one or more shapelets which are waveform patterns (identification patterns) effective for classification, an existence region (penalty degree) of each shapelet on time-series data, and a parameter of a classifier.

The reception module 101 receives an input of a time-series data set including the time-series data TSB for learning (step S101). The time-series data TSB is data to which a label indicating a correct answer class is given. The reception module 101 may receive an input of parameters such as the number K of shapelets and the length L of shapelet. The reception module 101 may be configured to use a default value without receiving input of a parameter. The default value of the number K of shapelets is, for example, 20. The default value of the length L of the shapelet is calculated, for example, by L=Q×(a value indicating a rate). A fixed value such as 0.1 may be set as the value indicating the rate.

The learning module 113 initializes the shapelet S, the penalty degree, and the parameters of the classifier (step S102). The simplest method of initialization is to set the value randomly.

Thereafter, the shapelet S, the penalty degree, and the parameter of the classifier are learned by repeating the following procedure (steps S103 to S109).

First, the distance calculation module 111 calculates distances between the I pieces of time-series data and the K shapelets (step S103). The distance calculation module 111 calculates the adjusted distance adjusted by using the penalty degree at each point in the time-series data (step S104).

The feature calculation module 112 calculates a feature amount from the adjusted distance, for example, by using Formula (4) (step S105).

The learning module 113 calculates the classification loss from the calculated feature amount and the parameter of the classifier. Then, the learning module 113 updates the shapelet and the parameters of the classifier so as to reduce the classification loss (step S106). Furthermore, the learning module 113 updates the penalty degree so as to reduce the classification loss (step S107). Furthermore, the learning module 113 updates the penalty degree such that the penalty degrees at adjacent points approach the same value (step S108).

The learning module 113 determines whether to end the repetition (step S109). For example, when the number of repetitions reaches the upper limit value, the learning module 113 determines to end the repetition. When it is determined not to end the repetition (Step S109: No), the process returns to Step S103, and the process is repeated.

When it is determined to end the repetition (Step S109: Yes), the learning process ends. In addition, the learning module 113 stores the shapelet S, the penalty degree, and parameters of the classifier which are obtained by the learning process in the storage unit 131.

Figure 3:
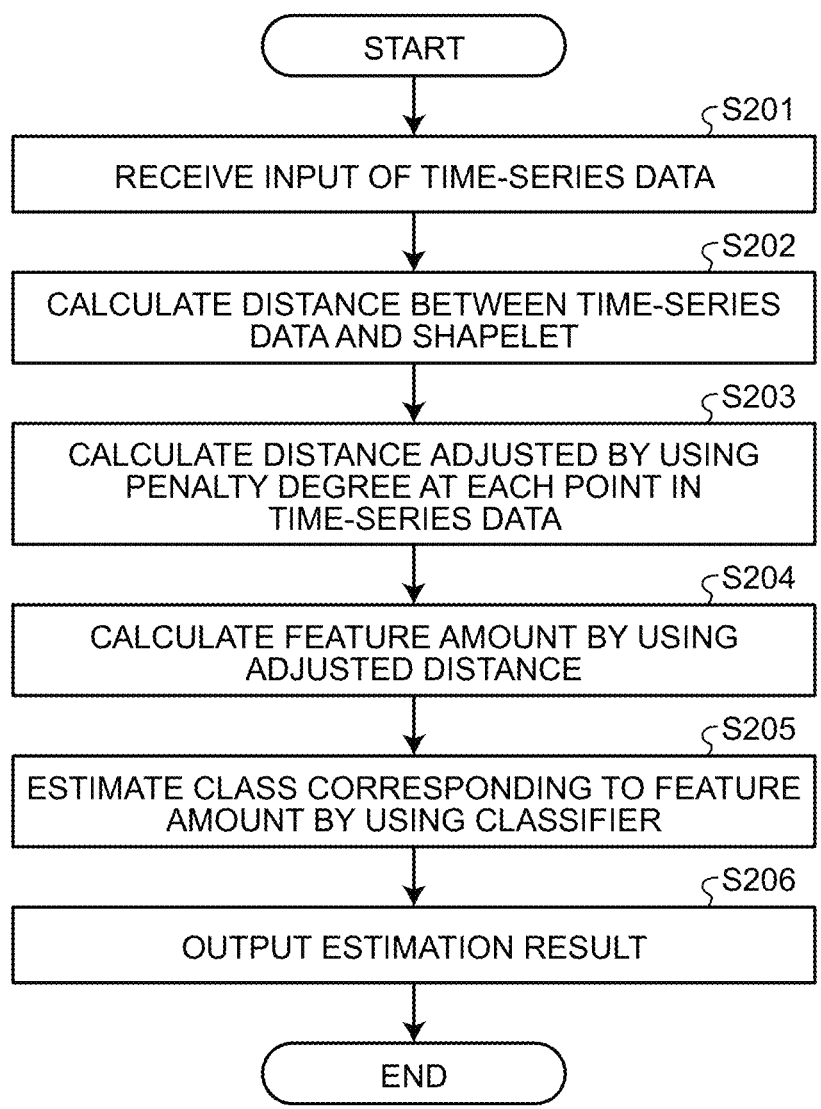
FIG. 3 is a flowchart illustrating an estimation process according to the first embodiment.

Next, the flow of the estimation process by the information processing device 100 according to the first embodiment is described. FIG. 3 is a flowchart illustrating an example of the estimation process according to the first embodiment. An object of the estimation process is to classify the time-series data TSA to be estimated into classes by using the classifier (estimation model), the shapelet, and the penalty degree learned by the learning process and visualize the classification result, the shapelet contributing to the classification, and the existence region of the corresponding shapelet together with the time-series data.

The reception module 101 receives the input of the time-series data TSA to be estimated and information of the learned classifier (estimation model), shapelet, and penalty degree (step S201). Note that, in the estimation process, the shapelet S, the penalty degree, and the parameters of the classifier are not initialized as at the time of learning, and the input information is used as it is.

Steps S202 to S204 for calculating the feature amount for the time-series data are similar to steps S103 and S105 of the learning process.

The estimation module 114 performs class classification by using the calculated feature amount and the parameters of the classifier (step S205).

The output control module 102 outputs the estimation result by the estimation module 114 (step S206) and ends the estimation process. For example, the output control module 102 displays, on the display unit 132, a display screen obtained by visualizing the shapelet contributing to the classification and the existence region of the shapelet contributing to the classification together with the time-series data.

Figure 4:
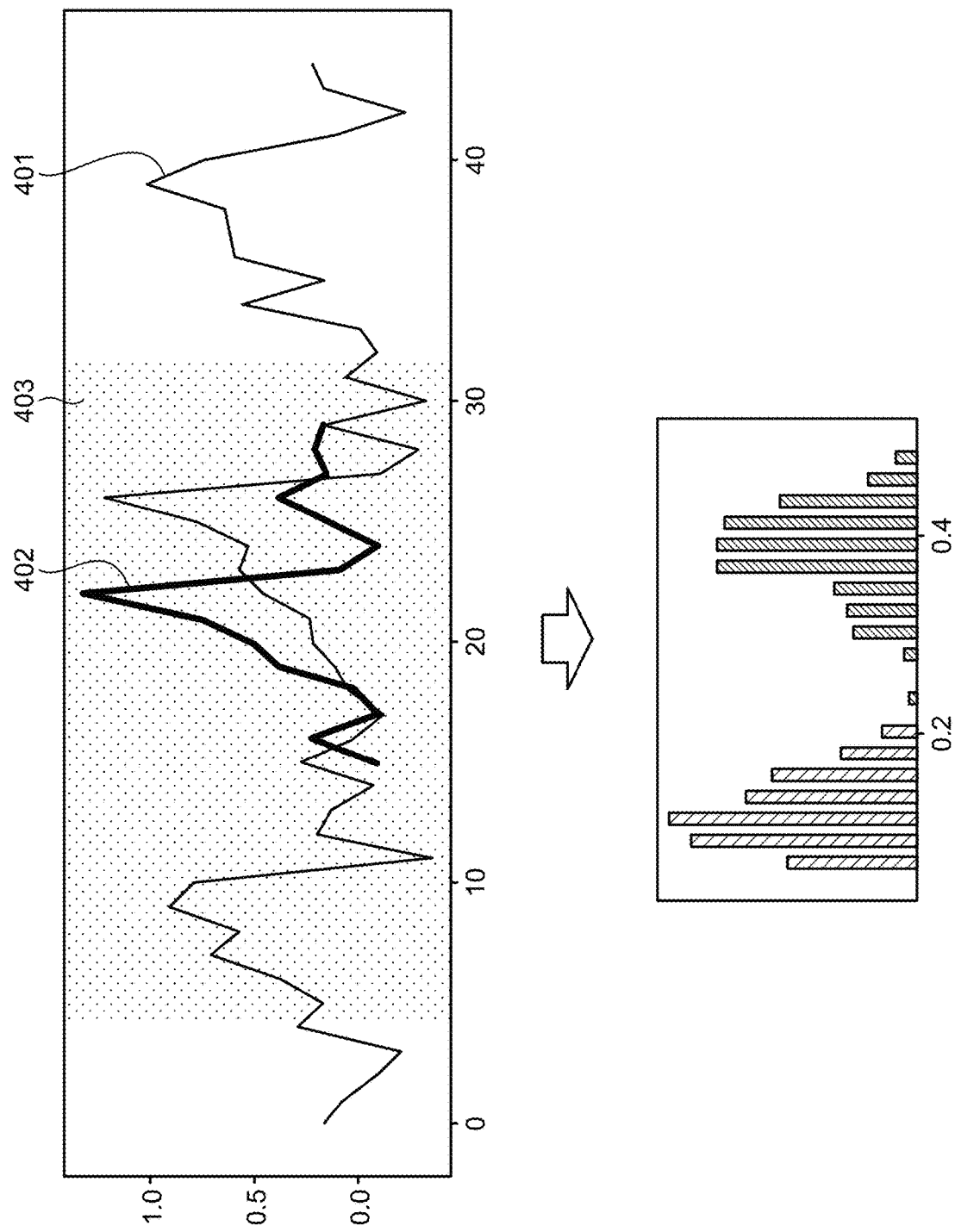
FIG. 4 is a diagram illustrating an example of a display screen according to the first embodiment.

FIG. 4 is a diagram illustrating an example of a display screen according to the first embodiment. FIG. 4 illustrates an example of visualizing a case where the number of shapelets 402 contributing to classification is one, and an existence region 403 of the shapelets 402 is specified as one region near the center of time-series data 401. A bar graph at the lower part of FIG. 4 illustrates an example of a distribution of feature amounts (distances from the shapelets) when class classification of a large number of pieces of time-series data is executed.

Note that the existence region 403 is specified, for example, as a point (time) at which the penalty degree is a threshold or less. If learning is performed by using a loss including a term for updating so that values of a plurality of degrees of existence (penalty degrees) at adjacent times come close as in Formula (6), the existence region can be set to a wide region that is continuous as much as possible on the time-series data.

Figure 5:
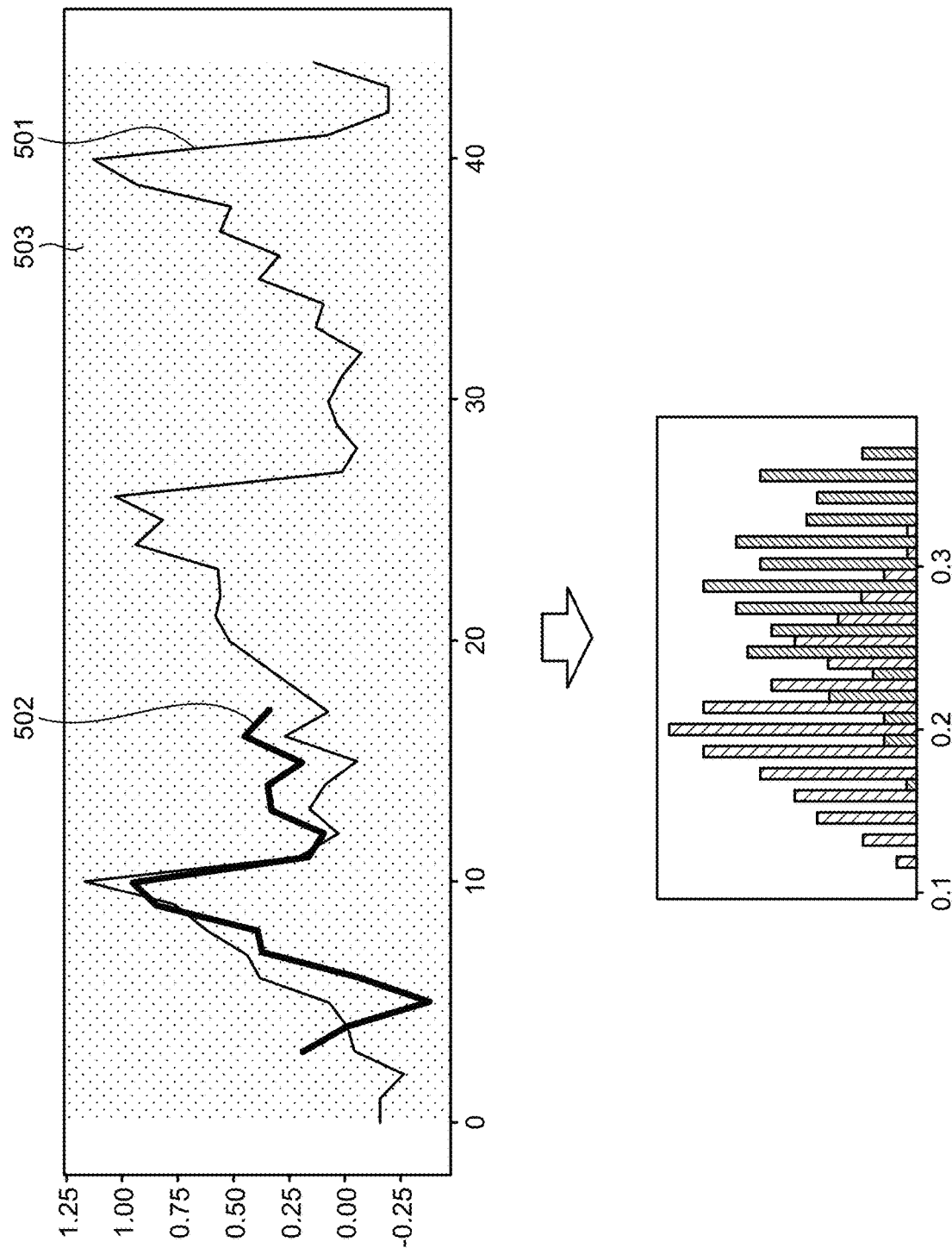
FIG. 5 is a diagram illustrating an example of a display screen according to a comparative example.

FIG. 5 is a diagram illustrating an example of a display screen according to a comparative example in which an existence region of a shapelet is not learned. FIG. 5 illustrates an example of visualizing a shapelet 502 on time-series data 501 when the number of shapelets 502 contributing to the classification is one. Note that, for convenience of description, an existence region 503 corresponding to the entire region of the time-series data 501 is displayed, but the existence region 503 may not be visualized.

Note that, in the time-series data of FIGS. 4 and 5, the gradients of the upwardly pointed waveforms near the center are different, but the gradients of the upwardly pointed waveforms near the left and right ends are the same. That is, FIGS. 4 and 5 are examples in which data is classified into any one of two classes (for example, the normal class and the abnormal class) by partial time-series data near the center.

In the comparative example (FIG. 5) in which the existence region is not learned, the shapelet is adapted to any region on the time-series data. Therefore, for example, in the time-series data on which noise is superimposed, it is likely that a shapelet is erroneously adapted. FIG. 5 illustrates an example in which a shapelet is erroneously adapted to the waveform near the left end instead of the waveform near the center. As a result, the shapelets are not correctly learned, and the feature amounts between the two classes cannot be sufficiently separated from the time-series data to be estimated in the estimation process. The bar graph in the lower part of FIG. 5 illustrates a state in which the distribution of the feature amounts is not separated.

On the other hand, in the present embodiment (FIG. 4) in which the existence region is learned, the existence region of the shapelet is specified while learning the shapelet. In the example of FIG. 4, the existence region excluding the vicinity of both left and right ends is learned. As a result, even in the time-series data on which the noise is superimposed, the shapelet is adapted to the central waveform. As a result, the shapelets are also correctly learned, and the feature amounts between the two classes can be more appropriately separated even in the time-series data to be estimated. In addition, it is also possible to present, to the user, information that a shapelet effective for classification exists near the center of the time-series data and does not exist at both ends.

As described above, in the first embodiment, one or more existence regions on the time-series data in which each shapelet exists are simultaneously and efficiently learned, in addition to learning of the shapelet and the classifier. As a result, the accuracy of estimation using the estimation model for the time-series data can be improved. In addition, by displaying (visualizing or presenting) not only the shapelets serving as the bases of classification but also the existence region, it is possible to provide more explanatory information to the user.

Second Embodiment

The distance between each shapelet and the partial time-series data may include a plurality of types (components) of distances, such as a distance related to the shape of the waveform, a distance related to the height of the waveform, and a distance related to the size of the waveform. In the shapelet learning method in the related art, the use of such a plurality of types of distances, a degree to which the plurality of types of distances contribute to classification (hereinafter, a contribution degree), and the like are not considered.

An information processing device according to a second embodiment classifies time-series data by using a plurality of types of distances and also visualizes a contribution degree of each classification of the plurality of types of distances.

Figure 6:
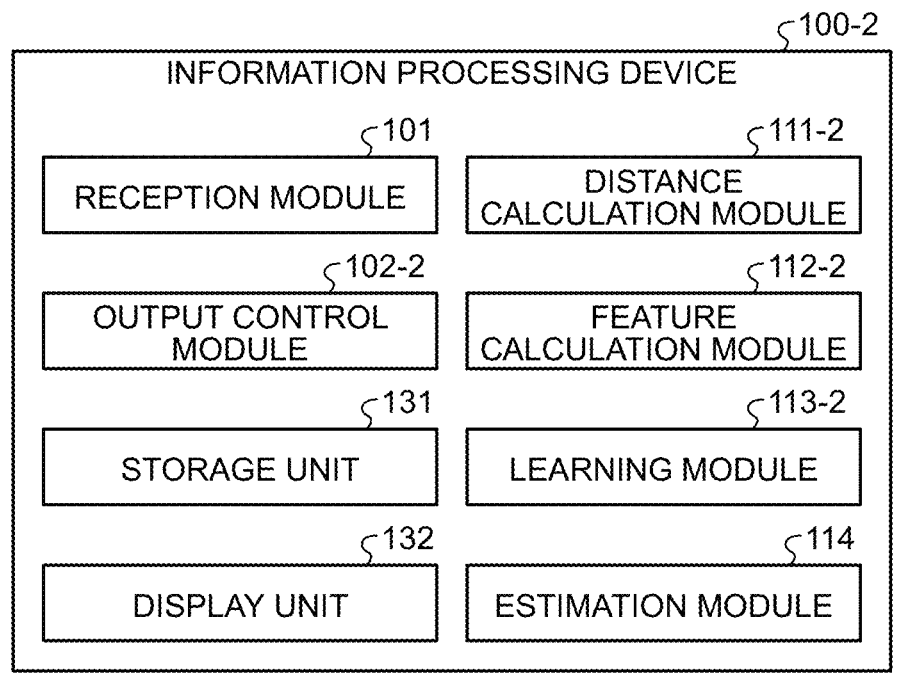
FIG. 6 is a block diagram illustrating an information processing device according to a second embodiment.

FIG. 6 is a block diagram illustrating an example of a configuration of an information processing device 100-2 according to the second embodiment. As illustrated in FIG. 6, the information processing device 100-2 includes the reception module 101, an output control module 102-2, a distance calculation module 111-2, a feature calculation module 112-2, a learning module 113-2, the estimation module 114, the storage unit 131, and the display unit 132.

In the second embodiment, functions of the output control module 102-2, the distance calculation module 111-2, the feature calculation module 112-2, and the learning module 113-2 are different from those in the first embodiment. Other configurations and functions are similar to those in FIG. 1 which is the block diagram of the information processing device 100 according to the first embodiment and thus are denoted by the same reference numerals, and description thereof here is omitted.

The distance calculation module 111-2 calculates distances (distances DA and DB) between the time-series data and the plurality of shapelets. First, the distance calculation module 111-2 calculates a plurality of types of distances. Hereinafter, each of the plurality of types of distances may be referred to as a distance component. The distance calculation module 111-2 calculates the distances DA and DB by integrating the plurality of distance components by using the contribution degree. As the integration method with the contribution degree, for example, a method of calculating an average value obtained by weighting each distance component by the contribution degree as the distance DA or DB can be applied.

An example of the type of distance is described below.

A difference between a statistic of the partial time-series data and a statistic of the shapelet. The statistic is, for example, an average value, a standard deviation, or a variance of the values at the respective points.

A distance between a shape of the partial time-series data and a shape of the shapelet.

A distance between a shape of the normalized partial time-series data and a shape of the shapelet.

A distance between a frequency component of the partial time-series data and a frequency component of the shapelet.

A distance between a p-th (p is an integer of 1 or more) derivative of the partial time-series data and a p-th derivative of the shapelet.

The difference between the average values can be interpreted as a deviation of the sensor value in the height direction (height direction of the waveform). The difference of the standard deviation or the difference of the variance can be interpreted as a difference of the magnitude of the amplitude. The distance between the shapes may be a Euclidean distance or a dynamic time-warping (DTW) distance. Normalization refers to, for example, eliminating the deviation of the sensor value in the height direction (that is, the average value of the partial time-series data is set to 0) and aligning the amplitude (that is, the standard deviation of the partial time-series data is set to 1).

In the present embodiment, two or more types of distances are used among the plurality of types of distances (distance components) as described above. Hereinafter, the number of distance components is N (N is an integer of 2 or more). Since N contribution degrees serve as parameters for each of the K shapelet $S_k$, a contribution degree V is a K×N continuous value matrix. Hereinafter, the n-th (n is an integer satisfying 1≤n≤N) contribution degree may be represented as $v_n$. The contribution degree $v_n$ is a K-dimensional vector.

For example, the distance calculation module 111-2 calculates distances $d_{i,k,j}(s_k, t_i)$ obtained by weighting a plurality of types of distances (distance components) with the contribution degree by Formula (8). Note that Formula (8) is an example in the case of N=3.

$$d_{i,k,j}(s_k, t_i) := \frac{\tilde{v}_1}{L_k}\|s_k - t_{i,j:j+L_k}^{normalized}\|_2^2 \qquad (8)$$
$$+ \tilde{v}_2(s_k^{mean} - t_{i,j:j+L_k}^{mean})^2$$
$$+ \tilde{v}_3(s_k^{std} - t_{i,j:j+L_k}^{std})^2$$

$t^{normalized}$ in Formula (8) is normalized partial time-series data and is calculated, for example, by Formula (9).

$$t_{i,j:j+L_k}^{normalized} \qquad (9)$$
$$:= \frac{1}{t_{i,j:j+L_k}^{std}-1}[t_{i,j} - t_{i,j:j+L_k}^{mean}, t_{i,j+1} - t_{i,j:j+L_k}^{mean}, \ldots, t_{i,j:j+L_k-1} - t_{i,j:j+L_k}^{mean}]$$

$s^{mean}$ and $s^{std}$ in Formula (8) are the mean and variance of the shapelets and are calculated, for example, by Formulas (10) and (11), respectively.

$$s_k^{mean} := \frac{1}{L_k}\sum_{l=1}^{L_k} s_{k,l} \qquad (10)$$

$$s_k^{std} := \sqrt{\frac{1}{L_k}\sum_{l=1}^{L_k}(s_{k,l} - s_k^{mean})^2} \qquad (11)$$

$t^{mean}$ and $s^{std}$ in Formula (8) are a mean and a variance of the partial time-series data and are calculated, for example, by Formulas (12) and (13), respectively.

$$t_{i,j:j+L_k}^{mean} := \frac{1}{L_k}\sum_{l=1}^{L_k} t_{i,j+l-1} \qquad (12)$$

$$t_{i,j:j+L_k}^{std} := \sqrt{\frac{1}{L_k}\sum_{l=1}^{L_k}(t_{i,j+l-1} - t_{i,j:j+L_k}^{mean})^2} \qquad (13)$$

$\tilde{v}_n$ in Formula (8) is normalized contribution degree $v_n$ and is calculated, for example, by Formula (14).

$$\tilde{v}_n = \frac{v_n^2}{v_1^2 + v_2^2 + v_3^2} \qquad (14)$$

The feature calculation module 112-2 calculates feature amounts $x_{i,k}$, for example, by Formula (15). Formula (15) is different from Formula (4) for calculating the feature amount $x_{i,k}$ of the first embodiment in that a distance calculated, for example, by the Formula (8) by using the contribution degree V is used.

$$x_{i,k}(s_k, t_i, m_k, v) := \min_{j=1,2,\ldots,J_k}(ReLU(-m_{k,j}) + 1)d_{i,k,j} \qquad (15)$$

The learning module 113-2 executes a learning process of updating the parameters of the classifier, the plurality of shapelets, the penalty degree $m'_k$, and the contribution degree V so as to reduce the classification loss.

For example, the learning module 113-2 executes the learning process according to Formula (16). The loss $G_i$ in Formula (16) is similar to Formula (6). In this manner, the learning module 113-2 executes the learning process further including updating of the contribution degree so as to reduce the error between the class output from the classifier and the correct answer class. As a method of updating the contribution degree V, for example, a method using a gradient descent method can be applied, similarly to the shapelet S, the parameters of the classifier, and the penalty degree.

$$S \in \prod_{k=1}^{K} \mathbb{R}^{L_k}, W \in \mathbb{R}^{C \times (K+1)}, M \in \prod_{k=1}^{K} \mathbb{R}^{J_k}, v \in \mathbb{R}^3 \overset{\text{minimize}}{\sum_{i=1}^{I} G_i} \quad (16)$$

The output control module 102-2 is different from the output control module 102 of the first embodiment in that the contribution degree is further output in addition to the shapelet, the class, and the penalty degree $m'_k$ obtained by the estimation process.

Figure 7:
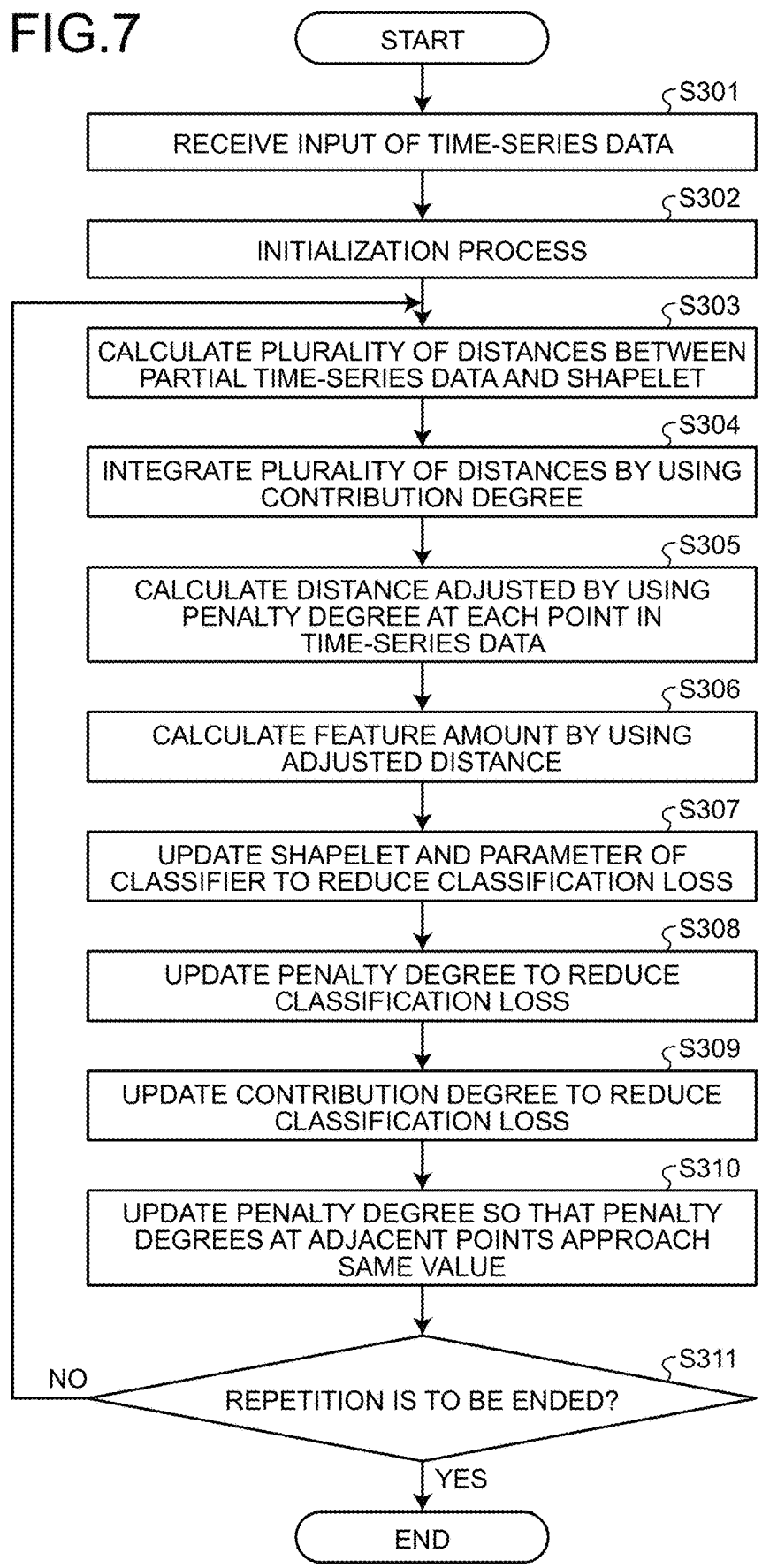
FIG. 7 is a flowchart illustrating a learning process according to the second embodiment.

Next, the learning process by the information processing device 100-2 according to the second embodiment is described with reference to FIG. 7. FIG. 7 is a flowchart illustrating an example of the learning process according to the second embodiment. In the present embodiment, the contribution degree V of the distance component is learned in addition to the shapelet S, the penalty degree, and the parameters of the classifier.

Similarly to step S101 (FIG. 2) of the first embodiment, the reception module 101 receives an input of a time-series data set including the time-series data TSB for learning (step S301).

The learning module 113-2 initializes the contribution degree, in addition to the shapelet S, the penalty degree, and the parameters of the classifier (step S302). The simplest method of initialization is to set the value randomly.

Thereafter, the shapelet S, the penalty degree, the parameter of the classifier, and the contribution degree are learned by repeating the following procedure (steps S303 to S311).

The distance calculation module 111-2 calculates a plurality of types of distances between the I pieces of time-series data and the K shapelets (step S303). The distance calculation module 111-2 integrates a plurality of types of distances by using the contribution degree (step S304). The distance calculation module 111-2 calculates distances obtained by weighting the plurality of types of distances (distance components) with the contribution degree, for example, by using Formula (8).

Since steps S305 to S308 are similar to steps S104 to S107 of the information processing device 100 of the first embodiment, the description thereof is omitted.

In the present embodiment, the learning module 113-2 updates the contribution degree of each distance component so as to reduce the classification loss (step S309).

Since steps S310 to S311 are similar to steps S108 to S109 of the information processing device 100 of the first embodiment, the description thereof is omitted.

Note that, the learning module 113-2 stores the shapelet S, the penalty degree, parameters of the classifier, and the contribution degree which are obtained by the learning process in the storage unit 131.

Figure 8:
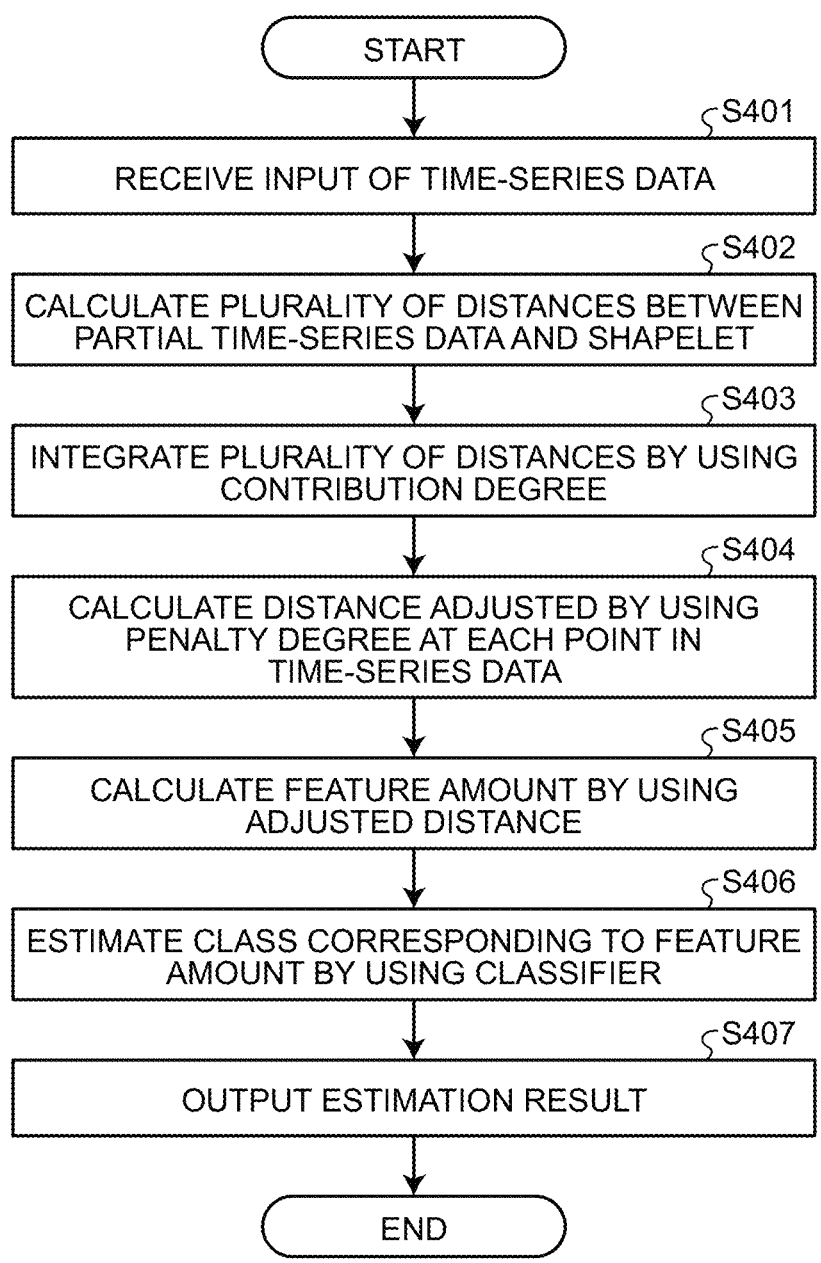
FIG. 8 is a flowchart illustrating an estimation process according to the second embodiment.

Next, the estimation process by the information processing device 100-2 according to the second embodiment is described with reference to FIG. 8. FIG. 8 is a flowchart illustrating an example of the estimation process according to the second embodiment. In the present embodiment, the contribution degree is visualized in addition to the classification result, the shapelet contributing to the classification, and the existence region of the corresponding shapelet.

The reception module 101 receives the input of the time-series data TSA to be estimated and information of the learned classifier (estimation model), shapelet, and penalty degree, similarly to step S201 according to the first embodiment (FIG. 3) (step S401).

Steps S402 to S405 for calculating the feature amount for the time-series data are similar to steps S303 and S306 of the learning process of FIG. 7.

The estimation module 114 performs class classification by using the calculated feature amount and the parameters of the classifier (step S406).

The output control module 102-2 outputs the estimation result by the estimation module 114 (step S407) and ends the estimation process. For example, the output control module 102-2 displays, on the display unit 132, a display screen obtained by visualizing the shapelet contributing to the classification, the existence region of the shapelet contributing to the classification, and contribution degree in association with the time-series data.

Figure 9:
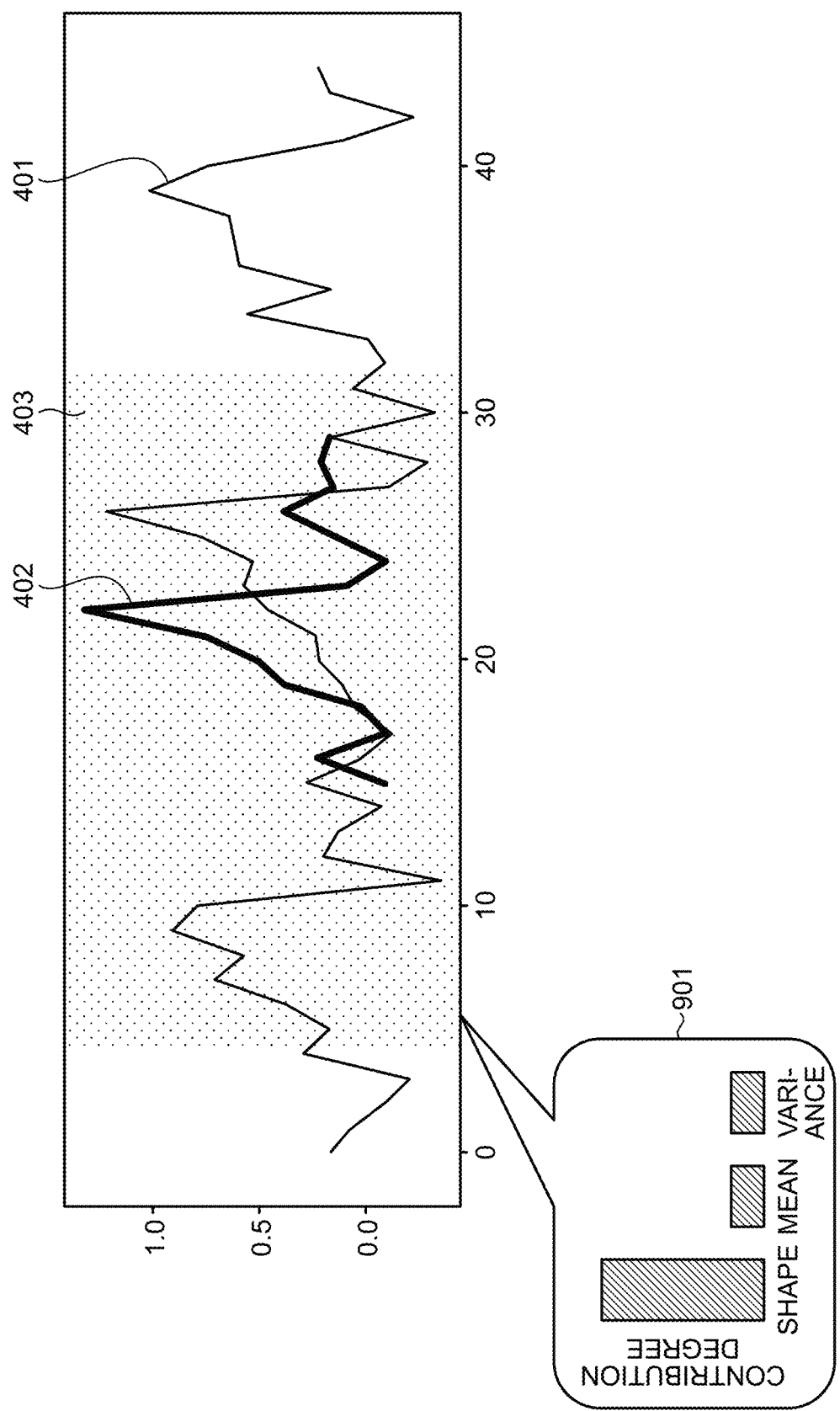
FIG. 9 is a diagram illustrating an example of a display screen according to the second embodiment.

FIG. 9 is a diagram illustrating an example of the display screen according to the second embodiment. FIG. 9 is an example of a display screen in which a display area 901 for displaying the contribution degree is added to the display screen (FIG. 4) of the first embodiment. As illustrated in FIG. 9, by displaying the contribution degree, it is possible to grasp a distance component contributing to classification for each shapelet. In the example of FIG. 9, it can be grasped that the difference due to the waveform shape is more effective for classification than the difference between the average and the variance.

As described above, the information processing device according to the second embodiment can specify and visualize the contribution degree for each distance component such as the shape deviation, the deviation (average) of the sensor value in the height direction, and the deviation in the magnitude (variance) of the amplitude. As a result, the user can utilize the contribution degree in the material for determining the classification basis.

As described above, according to the first and second embodiments, the accuracy of estimation using an estimation model for time-series data can be improved.

Figure 10:
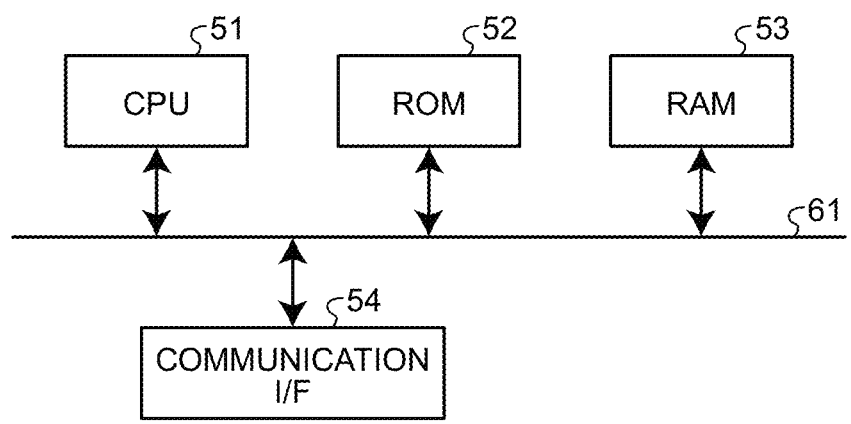
FIG. 10 is a hardware configuration diagram illustrating the information processing device according to the first or second embodiment.

Next, a hardware configuration of the information processing device according to the first or second embodiment is described with reference to FIG. 10. FIG. 10 is an explanatory diagram illustrating a hardware configuration example of the information processing device according to the first or second embodiment.

The information processing device according to the first or second embodiment includes a control device such as a CPU 51, storage devices such as a read only memory (ROM) 52 and a RAM 53, a communication I/F 54 that is connected to a network and performs communication, and a bus 61 that connects the respective units.

The program executed by the information processing device according to the first or second embodiment is provided by being incorporated in the ROM 52 or the like in advance.

The program executed by the information processing device according to the first or second embodiment may be configured to be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

Furthermore, the program executed by the information processing device according to the first or second embodiment may be configured to be stored on a computer connected to a network such as the Internet and provided by being downloaded via the network. In addition, the program executed by the information processing device according to the first or second embodiment may be configured to be provided or distributed via a network such as the Internet.

The program executed by the information processing device according to the first or second embodiment can cause the computer to function as each unit of the information processing device described above. In this computer, the CPU 51 can read the program from a computer-readable storage medium onto a main storage device and execute the program.

A configuration example of the embodiment is described below.

(Configuration Example 1) An information processing device includes one or more processors configured to:
  adjust a first distance between input first time-series data and a plurality of identification patterns respectively corresponding to a plurality of classes by using a degree of existence indicating a degree by which a plurality of times of the first time-series data are times at which the plurality of respective identification patterns exist;
  calculate a first feature amount indicating a feature of the first time-series data by using the adjusted first distance; and
  obtain, by inputting the first feature amount to an estimation model of inputting a second feature amount indicating a feature of second time-series data for learning and estimating a class of the classes corresponding to an identification pattern similar to the second time-series data among the plurality of identification patterns, the identification pattern similar to the first time-series data, the class, and the degree of existence, the estimation model learning a parameter, the similar identification pattern, and the degree of existence indicating a time at which the similar identification pattern exists to reduce an estimation error.

(Configuration Example 2) In the information processing device according to Configuration Example 1, the one or more processors are configured to execute a learning process of updating the parameter of the estimation model, the plurality of identification patterns, and the degree of existence by using the second time-series data to reduce an error between the class estimated by the estimation model and a correct answer class.

(Configuration Example 3) In the information processing device according to Configuration Example 2, the one or more processors are configured to update the degrees of existence such that values of a plurality of the degrees of existence at adjacent times come close to each other.

(Configuration Example 4) In the information processing device according to any one of Configuration Examples 1 to 3, the one or more processors are configured to adjust the first distance by multiplying by the degree of existence.

(Configuration Example 5) In the information processing device according to any one of Configuration Examples 1 to 4, the first distance is a sum of distances between the first time-series data and one or more of the plurality of identification patterns.

(Configuration Example 6) In the information processing device according to any one of Configuration Examples 1 to 5, the one or more processors are configured to display, on a display device, the class estimated for the first feature amount, the identification pattern corresponding to the estimated class, and the degree of existence.

(Configuration Example 7) In the information processing device according to any one of Configuration Examples 1 to 6, the first distance is calculated based on a plurality of types of distances between the first time-series data and the plurality of identification patterns and a contribution degree of each of the plurality of types of distances, and
  the estimation model learns the parameter together with the similar identification pattern, the degree of existence indicating the time at which the similar identification pattern exists, and the contribution degree to reduce an estimation error.

(Configuration Example 8) In the information processing device according to Configuration Example 7, the plurality of types of distances include two or more of:
  a difference between a statistic of partial time-series data corresponding to a length of the identification pattern included in the first time-series data and a statistic of the identification pattern;
  a distance between a shape of the partial time-series data and a shape of the identification pattern;
  a distance between a shape of the normalized partial time-series data and a shape of the identification pattern;
  a distance between a frequency component of the partial time-series data and a frequency component of the identification pattern; and
  a distance between a p-th (p is an integer of 1 or more) derivative of the partial time-series data and a p-th derivative of the identification pattern.

(Configuration Example 9) In the information processing device according to Configuration Example 7, the one or more processors are configured to display, on a display device, the class estimated for the first feature amount, the identification pattern corresponding to the estimated class, the degree of existence, and the contribution degree.

(Configuration Example 10) In the information processing device according to any one of Configuration Examples 1 to 9, the one or more processors are configured to:
  adjust the first distance by using the degree of existence;
  calculate the first feature amount; and obtain the identification pattern similar to the first time-series data, the class, and the degree of existence by inputting the first feature amount to the estimation model.

(Configuration Example 11) An information processing method, which is executed by an information processing device, includes:
  adjusting a first distance between input first time-series data and a plurality of identification patterns respectively corresponding to a plurality of classes by using a degree of existence indicating a degree by which a plurality of times of the first time-series data are times at which the plurality of respective identification patterns exist;
  calculating a first feature amount indicating a feature of the first time-series data by using the adjusted first distance; and
  obtaining, by inputting the first feature amount to an estimation model of inputting a second feature amount indicating a feature of second time-series data for learning and estimating a class of the classes corresponding to an identification pattern similar to the second time-series data among the plurality of identification patterns, the identification pattern similar to the first time-series data, the class, and the degree of existence, the estimation model learning a parameter, the similar identification pattern, and the degree of existence indicating a time at which the similar identification pattern exists to reduce an estimation error.

(Configuration Example 12) A computer program product includes a computer-readable medium including programmed instructions, the instructions causing a computer to execute:

adjusting a first distance between input first time-series data and a plurality of identification patterns respectively corresponding to a plurality of classes by using a degree of existence indicating a degree by which a plurality of times of the first time-series data are times at which the plurality of respective identification patterns exist;

calculating a first feature amount indicating a feature of the first time-series data by using the adjusted first distance; and obtaining, by inputting the first feature amount to an estimation model of inputting a second feature amount indicating a feature of second time-series data for learning and estimating a class of the classes corresponding to an identification pattern similar to the second time-series data among the plurality of identification patterns, the identification pattern similar to the first time-series data, the class, and the degree of existence, the estimation model learning a parameter, the similar identification pattern, and the degree of existence indicating a time at which the similar identification pattern exists to reduce an estimation error.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
one or more processors configured to:
adjust a first distance between first time-series data inputted to the one or more processors and a plurality of identification patterns respectively corresponding to a plurality of classes by using a degree of existence indicating a degree by which a plurality of times of the first time-series data are times at which the plurality of respective identification patterns exist;
calculate a first feature amount indicating a feature of the first time-series data by using the adjusted first distance; and
obtain an identification pattern similar to the first time-series data, a class of the plurality of classes, and the degree of existence by inputting the first feature amount to an estimation model, the estimation model inputting a second feature amount indicating a feature of second time-series data for learning to estimate a class of the plurality of classes corresponding to an identification pattern similar to the second time-series data among the plurality of identification patterns, the estimation model learning a parameter, the similar identification pattern, and the degree of existence indicating a time at which the similar identification pattern exists to reduce an estimation error.

2. The device according to claim 1, wherein
the one or more processors are configured to execute a learning process of updating the parameter of the estimation model, the plurality of identification patterns, and the degree of existence by using the second time-series data to reduce an error between the class estimated by the estimation model and a correct answer class.

3. The device according to claim 2, wherein the one or more processors are configured to
use a plurality of degrees of existence, and
update the plurality of degrees of existence such that values of a plurality of the degrees of existence at adjacent times come close to each other.

4. The device according to claim 1, wherein
the one or more processors are configured to adjust the first distance by multiplying by the degree of existence.

5. The device according to claim 1, wherein
the first distance is a sum of distances between the first time-series data and one or more of the plurality of identification patterns.

6. The device according to claim 1, wherein
the one or more processors are configured to display, on a display device, the class estimated for the first feature amount, the identification pattern corresponding to the estimated class, and the degree of existence.

7. The device according to claim 1, wherein
the first distance is calculated based on a plurality of types of distances between the first time-series data and the plurality of identification patterns and a contribution degree of each of the plurality of types of distances, and
the estimation model learns the parameter together with the similar identification pattern, the degree of existence indicating the time at which the similar identification pattern exists, and the contribution degree to reduce an estimation error.

8. The device according to claim 7, wherein
the plurality of types of distances include two or more of:
a difference between a statistic of partial time-series data corresponding to a length of the identification pattern included in the first time-series data and a statistic of the identification pattern;
a distance between a shape of the partial time-series data and a shape of the identification pattern;
a distance between a shape of normalized partial time-series data and a shape of the identification pattern;
a distance between a frequency component of the partial time-series data and a frequency component of the identification pattern; and
a distance between a p-th (p is an integer of 1 or more) derivative of the partial time-series data and a p-th derivative of the identification pattern.

9. The device according to claim 7, wherein
the one or more processors are configured to display, on a display device, the class estimated for the first feature amount, the identification pattern corresponding to the estimated class, the degree of existence, and the contribution degree.

10. The device according to claim 1, wherein
the one or more processors are configured to:
adjust the first distance by using the degree of existence;
calculate the first feature amount; and
obtain the identification pattern similar to the first time-series data, the class, and the degree of existence by inputting the first feature amount to the estimation model.

11. An information processing method executed by an information processing device, the method comprising:

adjusting a first distance between first time-series data inputted to the information processing device and a plurality of identification patterns respectively corresponding to a plurality of classes by using a degree of existence indicating a degree by which a plurality of times of the first time-series data are times at which the plurality of respective identification patterns exist;

calculating a first feature amount indicating a feature of the first time-series data by using the adjusted first distance; and obtaining an identification pattern similar to the first time-series data, a class of the plurality of classes, and the degree of existence by inputting the first feature amount to an estimation model, the estimation model inputting a second feature amount indicating a feature of second time-series data for learning to estimate a class of the plurality of classes corresponding to an identification pattern similar to the second time-series data among the plurality of identification patterns, the estimation model learning a parameter, the similar identification pattern, and the degree of existence indicating a time at which the similar identification pattern exists to reduce an estimation error.

12. A computer program product comprising a non-transitory computer-readable medium including programmed instructions, the instructions causing a computer to execute:

adjusting a first distance between input first time-series data and a plurality of identification patterns respectively corresponding to a plurality of classes by using a degree of existence indicating a degree by which a plurality of times of the first time-series data are times at which the plurality of respective identification patterns exist;

calculating a first feature amount indicating a feature of the first time-series data by using the adjusted first distance; and obtaining an identification pattern similar to the first time-series data, a class of the plurality of classes, and the degree of existence by inputting the first feature amount to an estimation model, the estimation model inputting a second feature amount indicating a feature of second time-series data for learning to estimate a class of the plurality of classes corresponding to an identification pattern similar to the second time-series data among the plurality of identification patterns, the estimation model learning a parameter, the similar identification pattern, and the degree of existence indicating a time at which the similar identification pattern exists to reduce an estimation error.

* * * * *